W. K. HENRY.
KNOB ATTACHMENT.
APPLICATION FILED SEPT. 2, 1909.
945,165.
Patented Jan. 4, 1910.
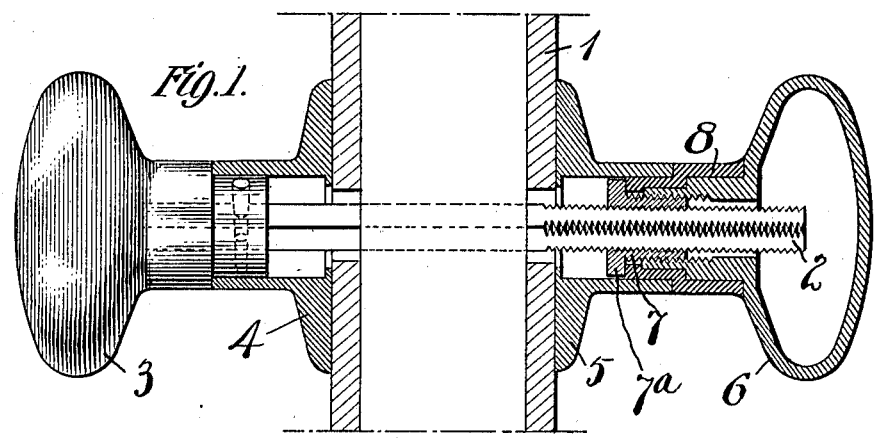
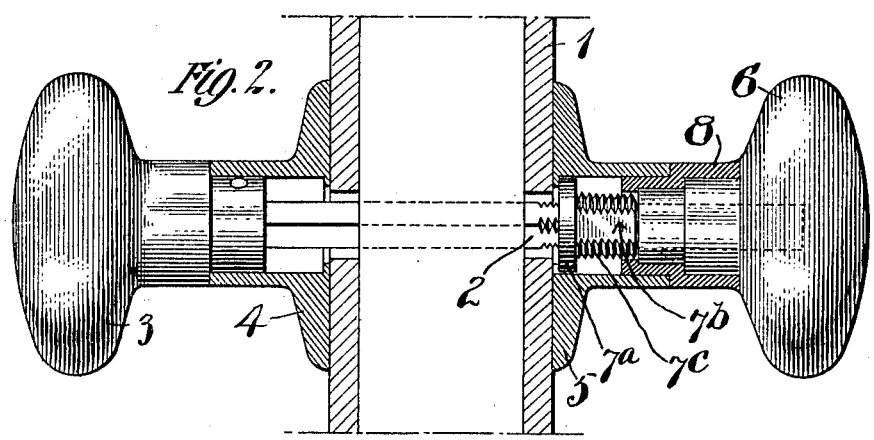
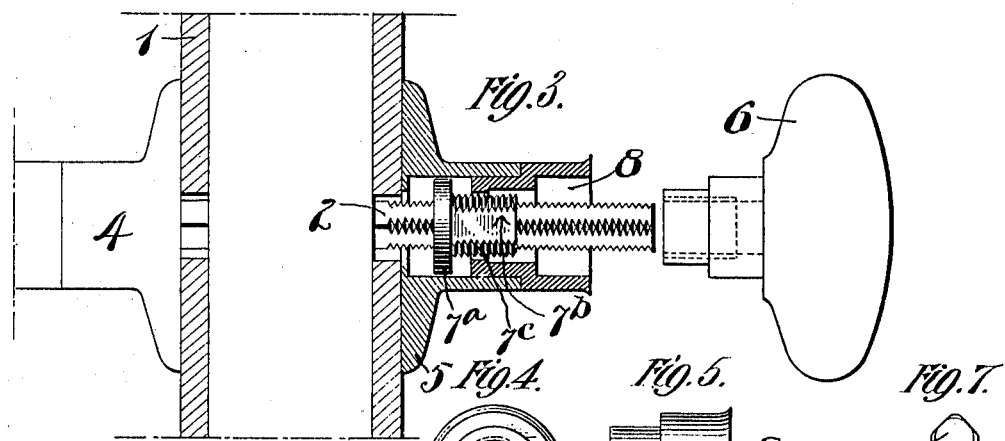
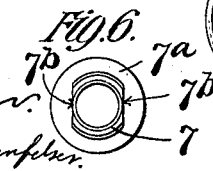
Witnesses:
Inventor.
W. K. Henry.
By his Attorneys

UNITED STATES PATENT OFFICE.

WILLIAM K. HENRY, OF NEW BRITAIN, CONNECTICUT, ASSIGNOR TO P. & F. CORBIN, OF NEW BRITAIN, CONNECTICUT, A CORPORATION OF CONNECTICUT.

KNOB ATTACHMENT.

945,165.

Specification of Letters Patent.

Patented Jan. 4, 1910.

Application filed September 2, 1909. Serial No. 515,852.

*To all whom it may concern:*

Be it known that I, WILLIAM K. HENRY, a citizen of the United States, residing at New Britain, county of Hartford, State of Connecticut, have invented certain new and useful Improvements in Knob Attachments, of which the following is a full, clear, and exact description.

My invention relates to certain new and useful improvements in so-called screwless knobs, the object being to provide a simple and effective means for securing a knob upon a spindle without the aid of the pins or screws such as are commonly employed.

In the drawings, Figure 1 is a side elevation partly in section of a door and two knobs together with their associated parts. Fig. 2 is in the main a similar view illustrating certain parts in a different position. Fig. 3 is in the main a similar view illustrating certain parts in still another position. Figs. 4, 5, 6 and 7 are views of details.

1 represents a portion of a door.

2 is a spindle of irregular cross section, by which I mean of any cross section other than round. As shown, the spindle is preferably square in cross section and has its corners threaded.

3 is a knob secured to one end of the spindle in any suitable manner.

4 is a bearing for the knob 3.

5 is a bearing for a knob 6.

The invention resides in the means for connecting the last mentioned knob to the spindle and said means comprises the following instrumentalities:

The shank of the knob 6 has a passage to receive the spindle 2. The inner end of this passage corresponds substantially in cross sectional outline to the cross sectional outline of the spindle so that said knob may slide to and fro upon the spindle but will not turn thereon. The outer end of the passage through the knob shank has an internal thread, as best seen in Fig. 1.

7 is a nut, internally threaded, to move to and fro upon the spindle 2, the corners of said spindle being threaded. The nut 7 has a flange 7$^a$ and is also slabbed off on one or both sides to provide the flat surfaces 7$^b$.

8 is an operating sleeve. This operating sleeve is revolubly mounted upon the shank of the knob and is properly shouldered to take against the bearing 5 and also against a shoulder on the knob shank. The smaller or inner end of the operating sleeve 8 has a passage corresponding in outline to the cross sectional outline of the nut 7 so that said nut may slide therein but not turn independently thereof. The nut 7 has an externally screw threaded portion 7$^c$, suitable to take into the internally threaded outer end of the shank of knob 6. The inner end of the operating sleeve 8 projects beyond the end of the knob shank, as shown, so that said sleeve will at all times engage the nut 7.

In Fig. 1 the sectional portion at the right hand side of the figure shows the relation of the various parts when the knob 6 is finally locked in place on the spindle 2.

Starting with the parts as indicated in Fig. 1, to release the knob the operating sleeve 8 is turned in the proper direction to turn the nut 7 forwardly upon the spindle 2 until finally its threaded portion 7$^c$ becomes disengaged from the knob 6, at which time the knob may be freely withdrawn from the spindle 2.

To assemble the parts, the nut is turned in to a point where it permits the knob to be slid fully into place, the turning-in movement being accomplished by the sleeve 8. The knob is then slid onto the spindle and the sleeve 8 is rotated in a direction to cause the nut 7 to travel outwardly on said spindle. As soon as the threaded end 7$^c$ of the nut engages the internal thread of the knob shank, the knob is locked or held from longitudinal movement. Continued rotation of the operating sleeve 8 in the same direction moves the nut from the position shown in Fig. 3 to that shown in Fig. 1, in which the shouldered portion 7$^a$ of said nut encounters the inner end of the operating sleeve 8 against which it frictionally jams, thus preventing the accidental displacement of the nut.

From the foregoing it will be seen that the knob 6 may be very quickly and easily connected with the spindle 2. The approximate adjustment of the knob upon the spindle is effected at the outset by simply pushing the knob on until it abuts against the sleeve 8 and until the sleeve 8 abuts against the bearing 5. If it should be found that the adjustment should be varied, it is merely necessary to release the parts, slide the knob 6 off the spindle 2 and turn it in one direction or the other so as to shift its position on the spindle, thus changing the position slightly in which the screw thread 7ᶜ of the nut engages the internal thread of the knob shank. A quarter or half turn will be sufficient to give the degree of freedom required.

While I have shown my knob as applied to a spindle provided at its opposite end with another knob, obviously this is only one of the many forms that may be employed, the invention residing, as before stated, in the means for securing a knob upon the spindle without the aid of the usual transverse screw or pin.

All of the parts may be very economically and rapidly produced and little or no difficulty will be encountered by the mechanic in assembling the same.

What I claim is:

1. In a device of the character described, a spindle of irregular cross sectional outline and having a threaded portion, a knob having a spindle passage, said knob being slidable but not rotatable on said spindle, a portion of said spindle passage being internally threaded, an internally threaded nut mounted upon the threaded portion of said spindle, said nut having an external thread arranged to coöperate with the internal thread in the spindle passage of the knob, and a rotatable operating device accessible for manual operation for rotating said nut.

2. In a device of the character described, a spindle, a knob having a shank arranged to slide but not turn on said spindle, a nut threaded to turn on said spindle and move longitudinally thereon, means to interlock one end of said nut with said knob shank, an operating device for said nut comprising a sleeve slidably engaging said nut and having an exposed portion for manual manipulation.

3. In a device of the character described, a spindle, a knob arranged to slide but not turn on said spindle, a nut threaded upon said spindle, a sleeve mounted to turn on a part of said knob, means of connection between said sleeve and said nut whereby the latter will be turned by the former and may slide relatively thereto and means to interlock said nut and knob.

4. In a device of the character described, a square spindle having threaded corners, a nut internally threaded to engage the threads on the spindle and having a shoulder at one end and having an external thread at the other end, a knob arranged to slide but not turn on said spindle, a sleeve mounted to turn around said spindle and operatively connected with said nut, whereby said nut may be rotated and moved to and fro by the rotation of said sleeve, the shoulder on said nut being arranged to engage against the inner end of said sleeve, the threaded portion of said nut being arranged to interlock with a portion of the knob.

5. In a device of the character described, a spindle having a threaded portion, a knob slidable but non-rotatable thereon, a nut threaded internally and mounted upon the threaded portion of said spindle, an operating device coöperating with said nut, said operating device and nut being free for relative independent longitudinal movement but being held against independent rotary movement, a thread on the outer end of said nut, and a threaded portion on said knob arranged to receive the threaded outer end of the nut.

WILLIAM K. HENRY.

Witnesses:
G. ERNEST ROOT,
WM. V. CALLUN.